UNITED STATES PATENT OFFICE 2,658,042

ION EXCHANGE RESINS FROM FORMALDEHYDE AND THE REACTION PRODUCT OF A CHLOROMETHYLATED POLYNUCLEAR HYDROCARBON AND A BASIC TERTIARY AMINE

Carl Erick Johnson, Westchester, Ill., assignor to National Aluminate Corporation, Chicago, Ill., a corporation of Delaware No Drawing. Application February 2, 1952, Serial No. 269,686

17 Claims. (Cl. 260—2.2)

This invention relates to new ion exchange resins and particularly to new ion exchange resins which have anion exchange capacity and also can have cation exchange capacity. The invention further relates to a process for removing anions from aqueous liquids by bringing said liquids into contact with a new ion exchanging resin which may also remove cations.

It is an object of this invention to provide a process of liquid purification by which anions and possibly also cations may be removed by exchange from the liquids.

Another object of the invention is to provide a resinous ion-exchanging polymerization and reaction product which is capable of removing anions and possibly also cations from solutions.

Another object of the invention is to provide new and improved resinous materials which are insoluble in aqueous acidic or alkaline solutions at elevated temperatures.

Still another object of the invention is to provide new and improved resinous materials which retain their physical form satisfactorily in the presence of flowing liquids.

A further object of the invention is to provide a new type of resinous ion-exchange material which may be readily regenerated to exchange anions and also possibly cations.

A still further object of the invention is to provide a new and improved method for producing resinous condensation products of the type described herein. Other objects will appear hereinafter.

In accomplishing these objects and in accordance with the invention it has now been found that new and improved water insoluble resinous products are obtained by polymerizing formaldehyde with a monomeric product obtained by reacting together a chloromethylated polynuclear hydrocarbon and a tertiary amine. The resinous products possess the properties of exchanging their anion groupings and some of them may also be employed to effect a simultaneous anion and cation exchange purification of liquids.

In the preferred practice of the invention it is possible to start with a polynuclear aromatic hydrocarbon such as naphthalene and chloromethylate it by known procedures. The chloromethylated naphthalene is then condensed with a tertiary amine, for example, pyridine or trimethylamine, to form a monomeric quaternary amine. The quaternary amine is polymerized with formaldehyde, preferably in a molal ratio of two mols formaldehyde to one mol amine, in the presence of a mineral acid, preferably at elevated temperatures on the order of about 30° C. to about 80° C. until a water insoluble resin is formed.

The resulting water insoluble resinous product has anion exchange capacity. The products can be regenerated without difficulty by treating with an alkali. Certain of the products also have cation exchange capacity in addition to anion exchange capacity and can be regenerated as to cations by treating with an acid or other suitable regenerant adapted to exchange cations such as calcium or magnesium with hydrogen, ammonium, potassium, lithium or sodium.

The invention will be further illustrated by the following examples which should not, however, be construed as limiting the invention.

Example I 2.3 mols naphthalene, 3 mols polymeric formaldehyde, 50 grams glacial acetic acid, 3 mols concentrated HCl and 27 ml. syrupy phosphoric acid were mixed together in a reaction flask and heated with stirring on the oil bath at 90–100° C. for 4½ hours. The product was poured into ½ liter of cold water and washed twice more by decantation with ½ liter of water and filtered. An oily product remains and is chloromethylated naphthalene.

13 grams of pyridine were then added to the oily product remaining and allowed to remain at room temperature for several days. A quaternary amine monomer is formed.

20 grams of this chloromethylated naphthalene-pyridine reaction product were dissolved in 12 ml. of 40% formalin (2 mols/mol of the above product) and 20 ml. of 96% sulfuric acid added. Then 35 ml. of 20–30% fuming sulfuric acid were added dropwise with stirring when the product solidified to a rubbery mass (in an oil bath at 30° C.). The flask was placed on a steam cone for an hour and then a further hour with a stream of air passing over the product. The product was then ground to pass #12 mesh and that retained on #40 mesh used for test.

The anion exchange capacity of the 12–40 mesh resin was determined according to known methods by titrating alkali liberated by the resin when 10% NaCl was passed through the resin in a tube. The resin was regenerated with 10% NaOH. The anion capacity was found to be about 3300 grains per cubic foot, calculated as calcium carbonate. The cation exchange capacity was determined by known methods after acid regeneration and was found to be about 7700 grains per cubic foot.

Example II

The quaternary amine monomer was prepared according to the method disclosed in Example I and polymerized as follows:

26 grams of the monomer, 9 grams of formaldehyde and 14 grams of zinc chloride were mixed in a reaction flask and dry HCl gas passed through the mixture with stirring at 70° C. for 2 hours and the resulting product was dried 20 hours at 93° C. The dried product was ground to pass #12 mesh.

The 12–40 mesh product exhibited anion exchange properties similar to the resin of Example I.

Example III

The chloromethylated naphthalene was prepared according to the method of Example I. Then the oily product was mixed with trimethyl amine and allowed to condense into a quaternary amine monomer.

Polymerization of the monomer with formaldehyde was carried out as described in Example I using a polymerization temperature of 50° C. and two mols of formaldehyde per mol of monomer. The resinous product was dried at 100° C. for 15 minutes. It had an anion capacity of 3200 grains per cubic foot.

Example IV

The process of Example I or II was repeated substituting phenanthrene for naphthalene. The resinous product was found to have an anion capacity of 3000 grains per cubic foot.

Example V

The process of Example I or II was repeated substituting diphenyl for naphthalene. The water-insoluble, stable resinous product was found to have an anion capacity of 2600 grains per cubic foot.

It will be seen from the foregoing examples that polynuclear aromatic hydrocarbons such as naphthalene, anthracene, phenanthrene and diphenyl are suitable as starting materials for the preparation of chloroalkylated derivatives which in turn are used in the condensation with a basic tertiary amine, e. g., pyridine, trimethyl amine, triethylamine, triisopropylamine, tri-n-butylamine and triamylamine.

The polynuclear aromatic hydrocarbon may be chloroalkylated as previously disclosed, or it may be alkylated and thereafter chlorinated to achieve the same chloroalkylated derivative. It is also contemplated that alkylated polynuclear aromatic hydrocarbons may be used as starting materials and chlorinated to achieve the desired product.

The condensation reaction results in a quaternary amine type of monomer which is thereafter polymerized with formaldehyde to form a water-insoluble resinous material suitable for use in de-ionization of water. One method of using the resins of the invention for effecting ion exchange is to form a bed of screened granules, and regenerate by passing a basic solution therethrough, such as sodium hydroxide, sodium carbonate or bicarbonate, or ammonium hydroxide. If the resin also has cation exchange capacity which it is desired to regenerate, this can be accomplished by passing therethrough an aqueous acid solution (e. g., $H_2SO_4$, HCl, or $H_3PO_4$) to produce the hydrogen form of the cation exchanger, or by passing therethrough an aqueous solution of sodium chloride, ammonium chloride, or potassium chloride. After washing out the excess regenerant, the exchanger bed is ready for use.

In use the liquid, containing ions to be exchanged for the exchangeable ions present in the resin, is trickled downwardly through the filter bed; the effluent then having its anions substantially extracted. In some cases the cations may also be extracted. An alternative method is to suspend finely divided particles of regenerated resin in a volume of liquid for a short time, say 30 minutes, whereafter the resin may be filtered out of the liquid. Similar processes can be adopted from those known in the water-softening art.

After the bed of resin has exchanged such an amount of ions that its efficiency is reduced or its capacity has become exhausted, the resin may be regenerated again through the use of alkalis. Usually the resin is treated with an alkali such as 10% sodium hydroxide to replace the negative ions of the electrolytes with hydroxyl groups. The resultant regenerated material possesses ion exchange properties comparable in effectiveness to the original material.

It will, of course, be understood that such materials may be only partially regenerated, i. e., either the anion or cation group may be regenerated, after which the regenerated materials can be employed to effect anion or cation exchange as may be desired. Regeneration with alkalis alone will produce a material capable of anion exchange while regeneration with acids alone will produce a cation exchange material where the material has a cation exchangeable group. The regeneration process is well known in the art and needs no further explanation.

The resins derive their anion exchange properties from the amino nitrogen. Where any of the described condensations is effected in the presence of sulfuric acid, the aryl nuclei of the resultant resins are partially sulfonated. The sulfonic groups give the resins cation exchange capacity. If the cation exchange groups are regenerated with an acid, —$SO_3H$ groups are formed. Subsequent regeneration of the anion exchange groups with a base (e. g., NaOH, KOH, or $NH_4OH$) will replace the hydrogen ion of the sulfonic group with the cation corresponding to that of the base.

It is not necessary to have acid regeneration followed by basic regeneration to give the resins mixed anion and cation exchange properties. In practice, the exhausted resin bearing Ca, Mg, $Cl^-$, $HCO_3^-$ and other anions and cations, is regenerated with NaOH or some other base, or even with NaCl, regeneration of both anion and cation exchange groups taking place. The regenerated resin is then in the sodium and hydroxyl form (where NaOH, for example, is used as the regenerant). Thus, it is unnecessary to regenerate with an acid, followed by a second regeneration with a base, as the basic regeneration will give the same end result.

The regeneration of the resins of this invention with sodium chloride merits special mention. When regenerated with sodium chloride, the resin is then in a condition to exchange sodium ions for calcium and magnesium, and chloride ions for sulfate and bicarbonate ions, the effluent from the resin bed containing sodium chloride. This process is advantageous where it is desired to have water of low hardness and where the total solids content is of no importance. Thus, the process is an improvement over the dual bed in such cases, although it does not reduce the total solids content of the effluent, since it requires use of only a single regenerant. Where a dual bed is employed, both an acid and a basic regeneration are required to place the anion and cation exchange resins in a condition to de-ionize the influent water. However, where de-ionized water is not required and hardness and scale forming ions are of critical importance, the process of the present invention is more economical.

It is believed to be apparent from the foregoing description that the products of this invention have remarkable and valuable properties of adsorption, absorption or exchange of anions and can also have cation exchange properties. The products are entirely different and superior to many other types of resinous condensation products which have been heretofore known. The ion exchange resins of this invention are not limited to use with aqueous liquids, but may also be employed to remove acidic and basic constituents from organic solvents or emulsions in which they are insoluble.

The invention is hereby claimed as follows:

1. A water insoluble ion exchange resinous material obtained by condensing (a) formaldehyde and (b) the monomeric quaternary amine product of the reaction of a chloromethylated polynuclear aromatic hydrocarbon and a basic tertiary amine.

2. A water insoluble ion exchange resinous material obtained by condensing (a) formaldehyde and (b) the monomeric quaternary amine product of the reaction of a chloromethylated polynuclear aromatic hydrocarbon with a tertiary amine from the group consisting of pyridine and trimethyl amine.

3. A water insoluble ion exchange resinous material obtained by condensing at a temperature between about 30° C. and 80° C. in the presence of a mineral acid (a) formaldehyde and (b) the monomeric quaternary amine product of the reaction of chloromethyl naphthalene with pyridine in the ratio of about 2 mols formaldehyde per mol of amine monomer.

4. A water insoluble ion exchange resinous material obtained by condensing at a temperature between about 30° C. and 80° C. in the presence of sulfuric acid (a) formaldehyde and (b) the monomeric quaternary amine product of the condensation of chloromethyl naphthalene with pyridine, in the ratio of about 2 mols formaldehyde per mol of amine monomer, the resinous product having capacity to exchange both anions and cations.

5. A process of liquid purification which comprises exchanging ions by contacting the liquid with a water-insoluble ion exchange resinous condensation product of (a) formaldehyde and (b) the monomeric quaternary amine product of the reaction of a chloromethylated polynuclear aromatic hydrocarbon with a basic tertiary amine.

6. The process according to claim 5 in which the amine is selected from the group consisting of pyridine and trimethyl amine.

7. A process of liquid purification which comprises exchanging ions by contacting the liquid with a water-insoluble ion exchange resinous condensation product obtained by condensing at a temperature between about 30° C. and 80° C. in the presence of a mineral acid (a) formaldehyde and (b) the monomeric quaternary amine product of the reaction of chloromethyl naphthalene with pyridine, in the ratio of about 2 mols formaldehyde per mol of amine monomer.

8. A process of liquid purification which comprises simultaneously exchanging anions and cations by contacting the liquid with a water-insoluble ion exchange resinous condensation product obtained by condensing at a temperature between about 30° C. and 80° C. in the presence of sulfuric acid (a) formaldehyde and (b) the monomeric quaternary amine product of the condensation of chloromethyl naphthalene with pyridine, in the ratio of about 2 mols formaldehyde per mol of amine monomer.

9. The method of making a water insoluble ion exchange resinous material which comprises condensing equimolar quantities of a chloromethylated polynuclear aromatic hydrocarbon and a basic tertiary amine to form a quaternary amine monomer, condensing said monomer with formaldehyde in the ratio of about two mols formaldehyde per mol of monomer at a temperature between about 30° C. and 80° C. in the presence of a mineral acid and recovering the water insoluble resinous product.

10. The method of making a water insoluble ion exchange resinous material having capacity to exchange both anions and cations which comprises condensing equimolar quantities of chloromethylated naphthalene and pyridine to form a quaternary amine monomer, condensing said monomer with formaldehyde in the ratio of about two mols formaldehyde per mol of monomer at a temperature between about 30° C. and 80° C. in the presence of sulfuric acid and recovering the water insoluble resinous product.

11. A water insoluble ion exchange resinous material which is the condensation product of formaldehyde and the monomeric quaternary amine product of the reaction of chloromethylated naphthalene and a basic tertiary amine.

12. A water insoluble ion exchange resinous material which is the condensation product of formaldehyde and a monomeric quaternary amine product of the reaction of chloromethylated phenanthrene and a basic tertiary amine.

13. A water insoluble ion exchange resinous material which is the condensation product of formaldehyde and a monomeric quaternary amine product of the reaction of chloromethylated diphenyl and a basic tertiary amine.

14. A water insoluble ion exchange resinous material which is the condensation product of formaldehyde and a monomeric quaternary amine product of the reaction of chloromethylated polynuclear aromatic hydrocarbon and a basic tertiary amine, said condensation product being sulfonated in the nucleus of the aromatic hydrocarbon and having the capacity to exchange both anions and cations.

15. A water insoluble ion exchange resinous material which is the condensation product of formaldehyde and the monomeric quaternary amine product of the reaction of a chloromethylated polynuclear aromatic hydrocarbon with a tertiary amine from the group consisting of pyridine and trimethyl amine, said condensation product being sulfonated in the aromatic nucleus of said hydrocarbon and having the capacity to exchange both anions and cations.

16. A water insoluble ion exchange resinous material which is the condensation product of formaldehyde and a monomeric quaternary amine product of the reaction of chloromethyl naphthalene and pyridine, said condensation product being sulfonated in the naphthalene nucleus and having the capacity to exchange both anions and cations.

17. A water insoluble ion exchange resinous material which is the condensation product of formaldehyde and a monomeric quaternary amine product of the reaction of chloromethyl naphthalene and trimethyl amine, said condensation product being sulfonated in the naphthalene nucleus and having the capacity to exchange both anions and cations.

CARL ERICK JOHNSON.

References Cited in the file of this patent

UNITED STATES PATENTS

| Number | Name | Date |
| --- | --- | --- |
| 2,591,573 | McBurney | Apr. 1, 1952 |
| 2,606,098 | Bauman | Aug. 5, 1952 |

FOREIGN PATENTS

| Number | Country | Date |
| --- | --- | --- |
| 1,001,106 | France | Oct. 17, 1951 |